Sept. 24, 1935.  R. S. WALKER  2,015,642
METHOD FOR TREATING LIMESTONE
Original Filed July 28, 1931  3 Sheets-Sheet 1
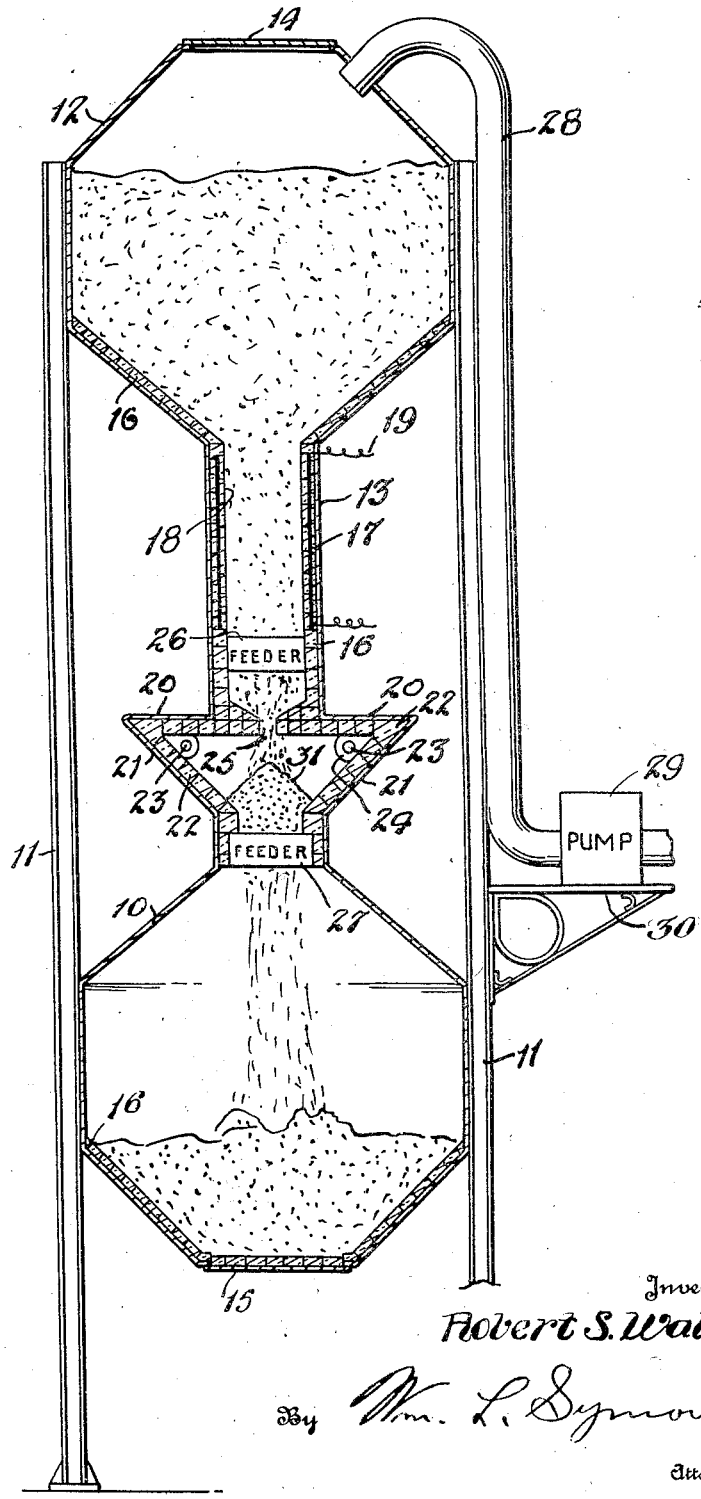

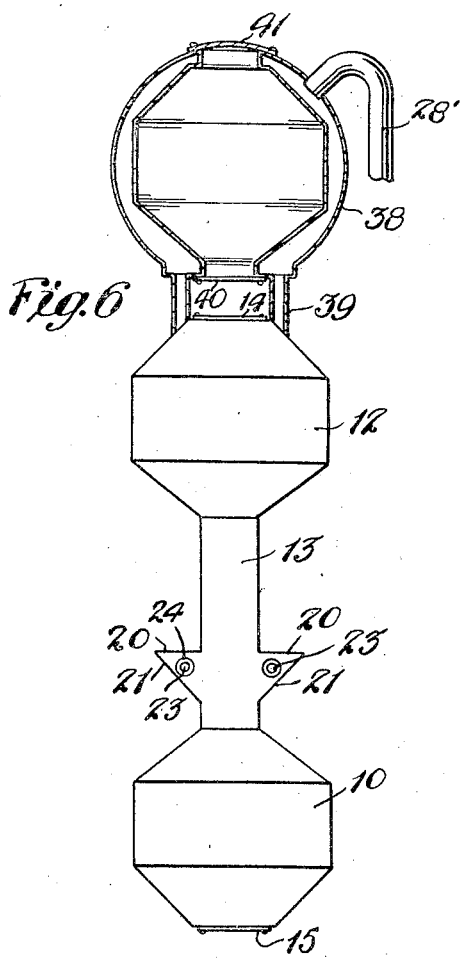
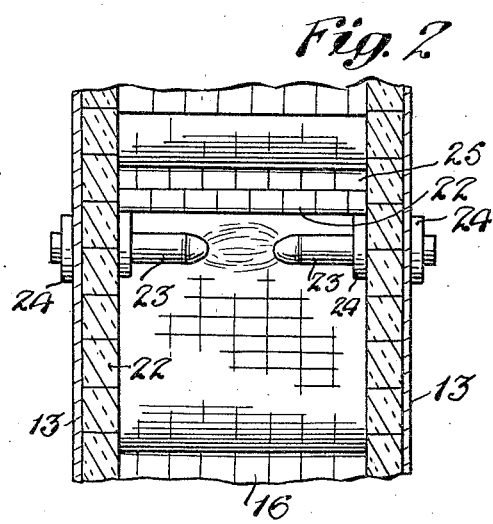
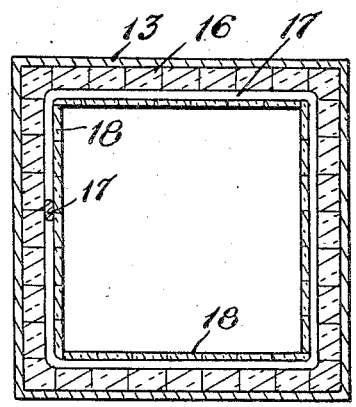
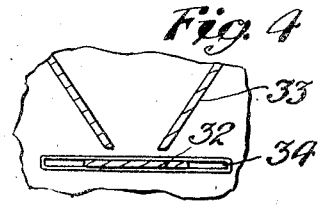
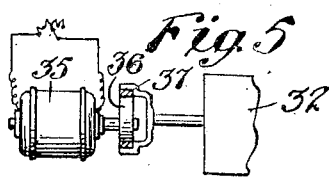

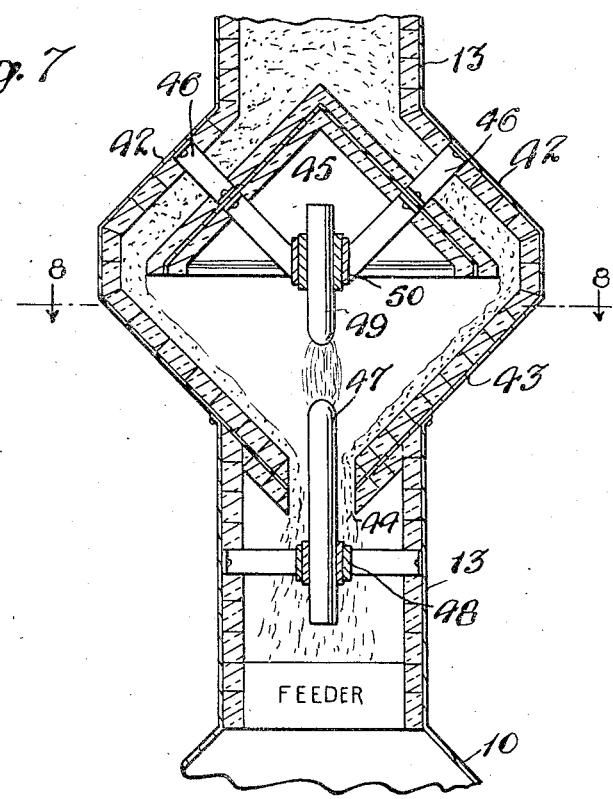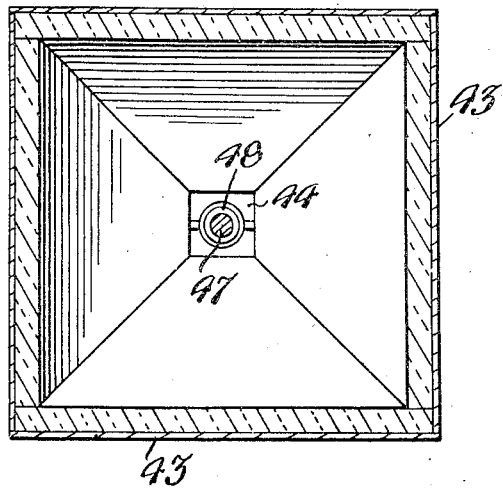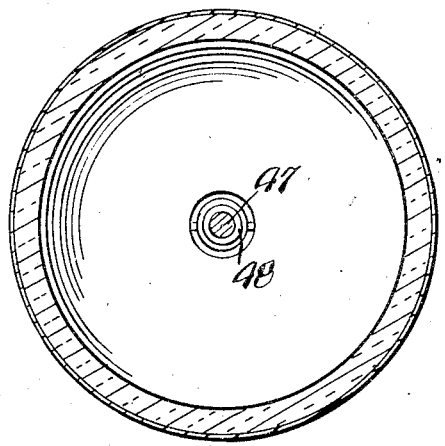

Patented Sept. 24, 1935

2,015,642

UNITED STATES PATENT OFFICE 2,015,642

METHOD FOR TREATING LIMESTONE

Robert S. Walker, Bellefonte, Pa., assignor to Electro Lime & Ice Corporation, Wilmington, Del., a corporation of Delaware Application July 28, 1931, Serial No. 553,583
Renewed June 12, 1934

22 Claims. (Cl. 263—53)

This invention relates to improvements in the treatment of limestone (alkali earth carbonate material capable of evolving substantially pure carbon dioxide) and more particularly to a method of treating limestone in which the carbon dioxide gas is recovered in its pure form.

Heretofore it has been customary to treat limestone with a coal or gas flame to form lime, but the carbon dioxide gas driven off by the heat of the flame was mixed with gases from the flame and with the air. The difficulties and expense involved in the complete separation of the carbon dioxide from the air and other gases were so great as to render prohibitive the recovery of carbon dioxide gas as a commercial by-product.

The electric heating of limestone was not seriously considered due to the belief that the cost of electric heating would be too great to form lime economically from limestone.

An important object of my invention is to provide a method and apparatus for electrically treating limestone to produce lime and carbon dioxide economically.

Another object of my invention is the provision of a method and an apparatus for recovering commercially pure carbon dioxide gas directly from the reduction of limestone into lime.

A further object of my invention is to provide a process of burning lime in which the temperature may be accurately controlled so that the lime will not be under or over burned.

Other objects and advantages of my invention will be apparent during the course of the following description.

In the accompanying drawings, which form a part of this specification, and wherein like characters of reference denote like or corresponding parts throughout the same, Figure 1 is a vertical sectional view of an apparatus embodying my invention, Figure 2 is a fragmentary sectional view taken at right angles to Figure 1 and showing the arrangement of one pair of electrodes, Figure 3 is a horizontal section through the portion of the furnace shaft in which the resistance heating elements are arranged, Figure 4 is a detail view showing one form of feeder in section, Figure 5 is a fragmentary detail showing one method of operating the feeder, Figure 6 is an elevation, partly in section, showing, somewhat diagrammatically, a modified form of furnace, Figure 7 is a fragmentary sectional view showing a modified form of arc chamber, Figure 8 is a horizontal sectional view on the line 8—8 of Figure 7, and, Figure 9 is a similar view of a further modification of the arc chamber.

In the drawings, wherein for the purpose of illustration is shown a preferred embodiment of my invention, the numeral 10 designates a lime supply tank spaced above the floor level and supported by spaced uprights 11. A limestone receiving tank 12 is also supported by uprights 11 and is spaced a substantial distance from, and in the present instance above, the tank 10. By arranging the tank 12 above the tank 10, I am enabled to utilize gravity to effect the feed of a continuous supply or stream of limestone from one tank to the other through a furnace disposed intermediate the two tanks and hereinafter described. A suitable hollow shaft 13 connects the tanks 10 and 12 and is arranged centrally thereof. The tanks and shaft may be of any desired size and shape. When the tanks each have a twenty-five ton capacity, the shaft will be about twelve inches square and of suitable length, such as about twenty-four feet. Where the tanks have a fifty ton capacity, the shaft would have a correspondingly increased size.

The upper tank 12 has a suitable charging opening in its top covered by a removable door 14. The lower tank 10 has a discharge opening in its lower end covered by a removable door 15. The shaft 13 and the lower walls of the tanks 10 and 12 are lined with a suitable refractory material 16. The lower walls of the upper tank 12 converge to the shaft 13 and the lower walls of the lower tank 10 converge to the discharge door 15.

The upper portion of the shaft 13 is provided with a suitable electric heating element. In the drawings I have illustrated this element as a resistance member arranged in the walls of the shaft and consisting of a coil 17 of resistance material arranged about the interior of the shaft. Any other form of resistance element may be used, however. The resistance member 17 is arranged in the walls of the shaft and is separated from the interior of the shaft by a thin layer of refractory material 18 which serves to protect the coil from the limestone passing through the shaft. Leads 19 connect the resistance element 17 with any suitable source of current and control apparatus. The resistance element will produce a heat of from 1500° to 1600° F., which, while not sufficient to disassociate the calcium carbonate into lime and carbon dioxide with some forms of limestone, serves to preheat the calcium carbonate.

In the lower portion of the shaft 13 I have provided an arc furnace which is disposed intermediate the two tanks whereby the limestone in passing from one tank to the other may be conducted in the form of a continuous supply or stream through the furnace. The shaft is widened adjacent its lower end to provide an arc chamber having a horizontal upper wall 20 on each side of the shaft, and inclined side walls 21 connecting the outer ends of the walls 20 with the shaft 13. The walls 20 and 21 are lined with high silica brick 22 to protect them from the high heat of the arc. A pair of horizontally aligned arcing electrodes 23 are arranged in the angle formed by each wall 20 with its adjacent wall 21 and are spaced a suitable distance from the walls. The electrodes are supported by any suitable form of adjustable holder indicated generally at 24, and the arcs pass between the electrodes of each pair, in a generally horizontal path indicated in Figure 2, which is taken on a line at right angles to Figure 1.

The shaft lining is built up to form a restricted passage 25 connecting the shaft 13 with the arc chamber, and the walls of the shaft slope downwardly to this passage. A feeder 26 of any suitable construction is arranged above the passage 25, and a similar feeder 27 is arranged in the shaft 13 between the arcing chamber and the lower tank 10. The feeder 26 insures a continuous supply or stream of limestone from the tank 12 and shaft 13 in and through the furnace, and the feeder 27 insures a corresponding discharge from the furnace at the desired rate of discharge. As will be understood, the material travels from the feeder 26 through the reduced passage 25 to the bottom of the furnace acted upon by the feeder 26 assisted by gravity, since the path of travel in the form illustrated is perpendicular or at an angle to the horizontal.

A pipe 28 extends into the upper portion of the tank 12, and passes down one of the uprights 11 to a pump 29 arranged on a suitable bracket 30 carried by the upright, and from the pump, the pipe leads to a suitable storage tank (not shown).

In operation, the tank 12 is filled with calcium carbonate in the form of any suitable limestone, and the tanks 10 and 12 and the shaft 13 are sealed. The current is then turned on, to operate the heating elements, and the tanks and shaft are exhausted of air by means of the pipe 28 and pump 29. The heating elements 17 preheats the limestone which is fed to the arcing chamber by the feeder 26. The limestone passes through the passage 25 continuously or, in other words, in a stream which, in the present instance, is a relatively thin stream. After the limestone passes through the passage 25 it is exposed to the reflected heat of the arcing electrodes 23. The limestone forms a ridge 31 in the bottom of the arcing chamber, where it is highly heated by the heat of the arcs reflected from the walls 20 and 21 onto the inclined sides of the ridge 31. It is a characterstic of the method employed that the limestone is continuously conducted through the heating area between the arcs or, in other words, is passed therethrough as a stream. By the statement that the limestone is passed in a stream through an electric heating area is meant that it is continuously conducted or caused to travel through the heated area whether in a vertical path as specifically illustrated or otherwise.

Carbon dioxide gas is driven off and being heated in the area of the electrodes or electrical heating elements is sucked up through the shaft and tank 12 to the pipe 28. The hot gas passing upwardly serves to preheat the limestone thereby serving to initiate calcination thereof and partially cool the gas. This is an important feature of the invention since the method involves the utilizing of heated carbon dioxide, the heat of which is produced by an electrical means, such as the electrodes 23, to initiate or cause calcination of the limestone by passing the hot carbon dioxide into contact with the limestone. The lime is fed into the tank 10 by the feeder 27.

The heat of the resistance element 17 and of the electrodes 23 may be independently regulated by any suitable control apparatus, and the time during which the limestone is subjected to the heat of the arc is controlled by the feeders 26 and 27. While the arc is too hot to play directly on the limestone, when reflected from the walls 20 and 21 it produces the desired heat without overheating the limestone. The arcs are spaced from the surfaces of the ridge 31 and a space of about eighteen inches has been found to be satisfactory, although this distance may be varied. The carbon dioxide being drawn from the limestone is a non-conductor and will partially insulate the limestone and the furnace walls from the direct heat of the arc. The carbon dioxide which is removed by the pump 29 is constantly replaced as more gas is liberated, and the limestone is consequently protected from overheating.

The amount of heat required, and the length of time during which the limestone is exposed to the heat of the arcs, varies with the character of limestone treated. Using Bellefonte limestone known as the Trenton Ledge of limestone, the resistance element can produce a heat of from 1500° to 1600° F. while the arc can produce a heat of from 2600° F. to 2650° F. The arc produces rapid burning of the limestone in a vacuum of from ten to fifteen pounds, and the temperature of the lime may be accurately controlled by its speed of movement. The feeders 26 and 27 are operated at the same speed to insure a constant level of limestone in the arcing chamber.

After the air has been completely exhausted, which is determined by a test of the carbon dioxide passing from the pipe 28, the carbon dioxide gas, in pure form, is led to a suitable storage tank, and forms a very valuable by-product to be used commercially as dry ice, or wherever desired. Due to the electric treatment and the partial vacuum, the carbon dioxide is unmixed with other gases, and expensive filtering processes are unnecessary. The partial vacuum or sub-atmospheric pressure has the effect of reducing the partial pressure of the evolved gas by rarifying or reducing the density of the latter and thereby facilitates the liberation of the evolved gas from the material passing through the chamber. Further, it lowers the temperature required for disassociation of the gas from the material.

My method of treating limestone in a continuously conducted or stream-form may be operated for about twenty-four hours without recharging the supply tank 12. The vacuum is not broken during this operation and the heat is retained within the furnace. Preheating of the limestone by means of the heated carbon dioxide gas, and by the resistance element 17, reduces the cost of operating the arc.

When the limestone has been exhausted, the lime is withdrawn through door 15, more limestone is charged through door 14, the furnace is sealed, a vacuum is formed and the operation proceeds. The furnace may be made in any size desired.

Where carbon electrodes are used, carbon monoxide will be formed, and it will be necessary to add pure oxygen to the gas in sufficient amounts to change the carbon monoxide to carbon dioxide. I prefer to use metal electrodes, however.

When limestone is burned at atmospheric pressure, the carbon dioxide gas clings about the limestone and its pressure prevents the liberation of further gas. When the burning takes place in a partial vacuum i. e., in an atmosphere which reduces the partial pressure of the evolved gas, thereby facilitating disassociation of the gas and carbonaceous material, the carbon dioxide is drawn off by the pump 29 as soon as it is released from the limestone, and consequently the lime and carbon dioxide are disassociated at a much lower temperature than would otherwise be required. For some limestones, such as those having a high magnesia content, this temperature is so low that the heat of the resistance element 17 is sufficient to burn them. It is possible to raise the temperature of the resistance element 17 to 1900° F. which is sufficiently high to burn many limestones in a partial vacuum. When burning such limestones, the arc need not be turned on.

In Figures 4 and 5 I have shown one well known type of feeder which may be used with my furnace. A reciprocating plate 32 is arranged beneath a chute 33 and is moved in a horizontal slot 34 by means of an electric motor 35 which operates an eccentric or cam 36 which in turn is connected to a strap 37 secured to the plate 32. The speed of the motor may be controlled to vary the speed of reciprocation of the plate 32.

In Figure 6 I have shown an arrangement for preheating a charge of limestone before it enters the furnace. A double walled container 38 is arranged above the tank 12 and contains a charge of limestone. The carbon dioxide gas passes from tank 12 through pipes 39 to the space between the walls of container 38. Pipe 28' is connected to the container and sucks the carbon dioxide out of the tank 12; around the container 38, between the walls thereof, and out to a storage tank. The limestone is heated and the gas cooled by this operation. A discharging door 40 is arranged in the under side of the container and a charging door 41 is arranged in its upper side. When it is desired to charge the tank 12, the heated limestone is transferred from container 38 to tank 12, and the container 38 is refilled.

In Figure 7 I have shown a modified form of arc furnace which may replace the arc unit shown in Figure 1. The arc chamber is enlarged and comprises outwardly diverging upper walls 42 arranged to form a pyramid opening into the shaft 13. The lower walls 43 converge downwardly to form an inverted pyramid the walls of which extend into the lower portion of the shaft 13 and terminate in an opening 44. The walls 42 and 43 meet at the center of the arc chamber and form a chamber which is widest at its center. A pyramidal spreader 45 is supported within the walls 42 by means of brackets 46, and is spaced from the walls 42, extending to the middle of the arc chamber. The walls 42 and 43 and both upper and lower surfaces of the spreader 45 are lined with refractory material such as high silica brick. An electrode 47 extends up through the opening 44 into the arc chamber and is adjustably supported by a clamp 48. A second electrode 49 is adjustably supported by a clamp 50 secured to the under side of the spreader 45.

Limestone from the shaft 13 feeds downwardly through the space between the walls 42 and the spreader 45 and slides down the inclined walls 43 in a thin layer to the opening 44. The arc burns the limestone on the walls 43 and the lime drops through the opening 44 into the shaft 13 where it is fed by the feeder 51 into the tank 10. The position of the arc may be adjusted by adjusting the electrodes 47 and 49, the higher the arc, the less intense being the heat. The heat of the arc will also be reflected downwardly by the underside of the spreader 45. The carbon dioxide will protect the limestone from overburning, and will be drawn up through the unburned limestone.

In Figure 9 the walls 43 are shown as conical instead of pyramidal, and the walls 42 and spreader 45 will have a similar shape.

It will be seen that I have provided a method and apparatus for producing lime and pure carbon dioxide gas directly from limestone in an efficient and economical manner by means of heat generated by electricity and therefore readily controlled.

While I have shown and described the preferred embodiment of my invention it is to be understood that various changes in the size, shape, and arrangement of parts may be resorted to without departing from the spirit of my invention or the scope of the subjoined claims.

Having thus described my invention what I claim and desire to protect by Letters Patent is:

1. The method of treating calcium carbonate material to obtain pure carbon dioxide which consists in positioning the material in a closed furnace above an electric heating chamber, exhausting the air from the furnace, preheating the material, passing the material through the heating chamber in a thin stream, and removing the liberated pure carbon dioxide.

2. The method of treating calcium carbonate material to obtain pure carbon dioxide which consists in positioning the material in a closed furnace above an electric heating chamber, exhausting the air from the furnace, preheating the material, passing the material through the heating chamber in a thin stream, and removing the liberated pure carbon dioxide by passing the same upwardly through the preheated material.

3. The method of treating calcium carbonate material to obtain a pure carbon dioxide which consists in positioning the material in a closed furnace above a preheating chamber and an electric heating chamber, passing the material through the preheating chamber and then through the electric heating chamber in a thin stream and under sub-atmospheric pressure, removing the liberated pure carbon dioxide by passing the same upwardly through the preheated material and controlling the flow of the material through the electric heating chamber to prevent overheating of the material during its treatment in the furnace.

4. The method of treating calcium carbonate material to obtain pure carbon dioxide which consists in positioning the material in a closed furnace above an electric arc chamber, exhausting the air from the furnace, preheating the material and continuously passing the material through the electric arc chamber in a thin stream to expose it to the reflected heat of the electric arc and removing the liberated pure carbon dioxide by passing the same upwardly through the preheated material.

5. The method of treating calcium carbonate material to obtain pure carbon dioxide which consists in positioning the material in a closed furnace above an electric chamber, exhausting the air from the furnace, preheating the material and continuously passing the material through the electric chamber in a thin stream, said electric heating chamber being subjected to a partial vacuum, removing the liberated pure carbon dioxide by passing the same upwardly through the preheated material and controlling the flow of the material through the electric chamber to prevent overheating of the material during its treatment in the furnace.

6. The method of treating calcium carbonate material to obtain carbon dioxide which consists in positioning the material in a closed furnace above an electric arc chamber, exhausting the air from the furnace, preheating the material and continuously passing the material through the electric arc chamber in a thin stream to expose it to the reflected heat of the electric arc, removing the liberated pure carbon dioxide by passing the same upwardly through the preheated material, controlling the flow of the material through the electric chamber and the control of the lime therefrom whereby to prevent overheating of the material during its treatment in the furnace.

7. The method of treating calcium carbonate material which consists in subjecting the material to the heat of an electric resistance element and then subjecting the preheated material in the form of a thin stream to the heat of an electric arc in a partial vacuum and removing the carbon dioxide as it is liberated.

8. The method of treating calcium carbonate material which consists in subjecting the material directly to the heat of an electric resistance element and subjecting the preheated material in the form of a thin stream to the heat of an electric arc in a partial vacuum and removing the liberated carbon dioxide by passing the same through the preheated material.

9. The method of treating calcium carbonate material to obtain pure carbon dioxide which consists in passing the material in a stream through a zone heated by direct heat of an electrical resistance element and in a closed unit and maintaining said unit under sub-atmospheric pressure and withdrawing the carbon dioxide as evolved through the zone supply in order to preheat the zone and reclaim the waste heat from the carbon dioxide gas.

10. The method of treating calcium carbonate material to obtain pure carbon dioxide which consists in subjecting the material to the direct heat of an electrical resistance element and passing the preheated material in a stream through the direct heat of a resistance unit of higher temperature than the preheating element and under sub-atmospheric pressure whereby to reclaim the pure carbon dioxide.

11. The method of treating calcium carbonate material to obtain lime and pure carbon dioxide which consists in subjecting the material to the direct heat of an electrical resistance element and passing the preheated material in a stream through the direct heat of a resistance unit of higher temperature than the preheating element and reclaiming the pure carbon dioxide by maintenance of an absolute vacuum pressure.

12. The method of treating calcium carbonate material to obtain substantially pure carbon dioxide which consists in passing the material in a stream through an electrically heated area maintained under sub-atmospheric pressure, and removing the liberated substantially pure carbon dioxide.

13. The method of treating calcium carbonate material to obtain substantially pure carbon dioxide which consists in passing the material in a stream through a closed area heated by an electrical heating unit, maintaining said area under sub-atmospheric pressure and withdrawing the carbon dioxide as evolved.

14. The method of treating calcium carbonate material to obtain substantially pure carbon dioxide which consists in passing the material in a stream through a closed area heated electrically maintaining said area under sub-atmospheric pressure and withdrawing the carbon dioxide as evolved in a direction counter to the path of travel of and in contact with the stream whereby to preheat the stream before it reaches the said heated area.

15. The method of treating calcium carbonate material to obtain substantially pure carbon dioxide which consists in positioning the material in a closed furnace above an electrically heated chamber, exhausting the air from the furnace whereby to maintain a sub-atmospheric pressure, continuously passing the material through the electrically heated chamber in a thin stream, said chamber being subjected to the sub-atmospheric pressure, and removing the liberated carbon dioxide as evolved.

16. The method of treating calcium carbonate material to obtain substantially pure carbon dioxide which consists in positioning the material in a closed furnace above an electrically heated chamber, exhausting the air from the furnace whereby to maintain a sub-atmospheric pressure, continuously passing the material through the electrically heated chamber in a thin stream, said chamber being subjected to the sub-atmospheric pressure, and removing the liberated carbon dioxide as evolved by passing the same upwardly through the furnace in a direction counter to the stream whereby to preheat the material.

17. The method of treating calcium carbonate material to obtain substantially pure carbon dioxide which consists in positioning the material in a closed furnace having a restricted portion, keeping the furnace under sub-atmospheric pressure, discharging the material in a stream through the restricted portion into an electrically heated area, and passing the carbon dioxide after it leaves said area through the material above the restricted portion.

18. The method of treating alkali earth carbonate material which consists in passing the same in a stream through a calcining chamber, maintaining in said chamber an atmosphere which reduces the partial pressure of evolved carbon dioxide by reducing the density thereof, heating said atmosphere to subject the stream as it passes through said chamber to heat sufficient to liberate carbon dioxide, excluding air from said chamber, removing the treated material, and removing the liberated substantially pure carbon dioxide.

19. The method of treating alkali earth carbonate material which consists in passing the same in a stream through a calcining chamber, maintaining in said chamber an atmosphere which reduces the partial pressure of evolved carbon dioxide by reducing the density thereof, heating said atmosphere by electrically generated heat to subject the stream as it passes through said chamber to heat sufficient to liberate carbon dioxide, excluding air from said chamber, removing the treated material at one end of the chamber, and removing the liberated substantially pure carbon dioxide at the other end of the chamber.

20. The method of treating alkali earth carbonate material which consists in passing the same in a substantially continuously moving stream through a calcining chamber, maintaining in said chamber an atmosphere which reduces the partial pressure of evolved carbon dioxide by reducing the density thereof, heating said atmosphere to subject the stream as it passes through said chamber to heat sufficient to liberate carbon dioxide, excluding air from said chamber, removing the treated material, and removing the liberated substantially pure carbon dioxide.

21. The method of treating alkali earth carbonate material which consists in passing the same in a substantially continuously moving stream through a calcining chamber, maintaining in said chamber an atmosphere which reduces the partial pressure of evolved carbon dioxide by reducing the density thereof, heating said atmosphere by electrically generated heat to subject the stream as it passes through said chamber to heat sufficient to liberate carbon dioxide, excluding air from said chamber, removing the treated material at one end of the chamber, and removing the liberated substantially pure carbon dioxide at the other end of the chamber.

22. The method of treating alkali earth carbonate material which consists in passing the same in a substantially continuously moving stream through a calcining chamber, excluding air from said chamber, maintaining in said chamber an atmosphere which reduces the partial pressure of the evolved gas by decreasing the density of the latter, heating said atmosphere by electrically generated heat to subject the stream as it passes through said chamber to heat sufficient to liberate carbon dioxide, causing the liberated carbon dioxide to travel in a stream counter to the path of travel of the material whereby to initiate calcination by means of the heated carbon dioxide, removing the liberated substantially pure carbon dioxide, and removing the treated carbonaceous material.

ROBERT S. WALKER.